United States Patent [19] | [11] 3,904,031
Kessler | [45] Sept. 9, 1975

[54] ELECTRIC COMPONENT PACKAGE

[75] Inventor: William R. Kessler, Corning, N.Y.

[73] Assignee: Corning Glass Works, Corning, N.Y.

[22] Filed: June 20, 1973

[21] Appl. No.: 371,898

[52] U.S. Cl. .................. 206/328; 206/331
[51] Int. Cl.² .................. B65D 85/42
[58] Field of Search .................. 206/328–332, 206/334, 443

[56] References Cited

UNITED STATES PATENTS

| | | | |
|---|---|---|---|
| 2,214,230 | 9/1940 | Freeburg | 206/331 X |
| 2,558,920 | 7/1951 | Baggs | 206/328 |
| 2,792,111 | 5/1957 | Ringler et al. | 206/329 |
| 2,881,911 | 4/1959 | Krill | 206/330 |
| 2,962,161 | 11/1960 | Lacy | 206/329 |
| 3,088,587 | 5/1963 | Dimmig et al. | 206/331 |
| 3,261,459 | 7/1966 | Anderson et al. | 206/330 |
| 3,322,268 | 5/1967 | Larkin | 206/329 |

FOREIGN PATENTS OR APPLICATIONS

| | | | |
|---|---|---|---|
| 680,632 | 10/1952 | United Kingdom | 206/331 |
| 67,075 | 1969 | Germany | 206/329 |
| 1,129,949 | 9/1956 | France | 206/331 |

*Primary Examiner*—William I. Price
*Assistant Examiner*—Steven E. Lipman
*Attorney, Agent, or Firm*—Charles W. Gregg; Clarence R. Patty, Jr.

[57] ABSTRACT

A package of electric components such as resistors, capacitors or diodes etc. each comprising a cylindrical body or a body having other planar cross-sectional configurations on planes taken normal to the length of each respective component and having terminal leads extending axially from each end of the body, and a strip of paper board of any suitable or convenient length embodying a row of corrugations or cells, the strip having a width greater than the length of each of the terminal leads of the electric components with a first terminal lead of each component disposed in one of the cells or corrugations. The transverse dimensions of the corrugations or cells is intermediate the transverse dimensions of the terminal leads and the bodies of the electrical components, and the components may comprise a continuous row or may be separated into groups for ease of counting of the components. A flexible or springy cover flap affixed to the strip of paper board normally at least partially covers the otherwise exposed second terminal lead of each component having a first lead disposed in the strip of paper board and normally prevents the components from inadvertently falling from the package. The cover flap can be manually moved from its normal position to remove one or more of the components from the package.

4 Claims, 5 Drawing Figures

ELECTRIC COMPONENT PACKAGE

BACKGROUND OF THE INVENTION

There is shown, for example, in FIG. 2 of U.S. Pat. No. 2,214,230, issued Sept. 10, 1940 to W. S. Freeburg a strip of corrugated paper board providing a carrier supporting a row of resistor units each having a cylindrical body and terminal leads extending axially from each end of such body with one of the leads of each unit disposed in one of the corrugations of said strip. A plurality of said strips of paper board are disposed in the base of a box to form a cellular core therein as illustrated in FIG. 1 of said patent and a cover is then placed over the box to cover the otherwise exposed terminal leads of the units and prevent inadvertent emission or falling of the units from the core and box. The box and core are thus arranged for packaging of a relatively large number of resistor units.

Oftentimes only a small number of resistor units, or similar electric components are requested by a customer such as a retail customer or individuals who have a hobby in electronics or similar electrical fields. Furthermore, within an electric company, research laboratory, or similar facility, a large quantity of resistor units or similar electric components may be stored for subsequent distribution in small quantities to different departments requesting such small quantities of the units or components. For the purpose of ease of handling and delivering of the requested small quantities of units or components, as well as providing some degree of protection therefor, it is expedient and convenient that small groups or quantities thereof be at least somewhat enclosed or contained in low priced packages from which they cannot fall out but which can also be readily manually manipulated or opened for removal of one or more of the enclosed or contained units or components, and then reclosed. It is, therefore, an object of the present invention to modify or make a modification to a carrier such as shown in FIG. 2 of the aforesiad patent to Freeburg and supporting a strip of electric components such as resistor units, such modification comprising the addition of a cover flap to such a carrier for the purposes mentioned above, such cover flap being relatively inexpensive to provide and attach to the carrier.

Other objects and characteristic features of the present invention will become apparent as the description proceeds.

SUMMARY OF THE INVENTION

It is believed that the invention herein disclosed is sufficiently summarized in the foregoing abstract of the disclosure and, therefore, to avoid needless repetition or redundancy, it is considered expedient to omit a detailed summary of the invention.

BRIEF DESCRIPTION OF THE DRAWINGS

In the drawings.

Similar reference characters refer to similar parts in each of the Figs. of the drawings.

PREFERRED EMBODIMENTS OF THE INVENTION

Figure 1:
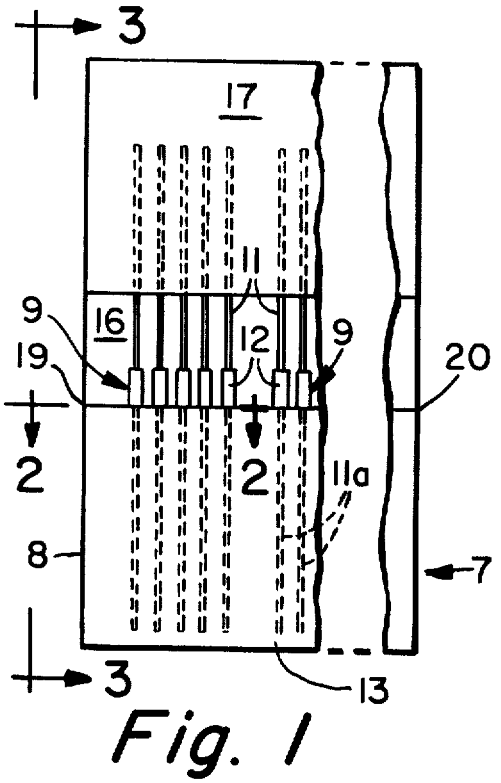
FIG. 1 comprises a top view of a package embodying the invention, a part of the center section being omitted for purposes of simplification of the drawings.

Referring to the drawings in detail, there is shown a package 7 containing a plurality of electric components such as 9 each of which includes a cylindrical body such as 12 (or a body having a rectangular, triangular, hexagonal, etc. planar transverse configuration as previously mentioned) with terminal leads such as 11 and 11*a* extending axially from each end of the body. The components such as 11 may be resistors, capacitors, diodes etc. of a relatively small size. The package per se includes a cellular strip of paper board such as 8 having a width greater than each of said terminal leads and comprising a pair of upper and lower spaced-apart facing paper sheets such as 13 embodying therebetween a plurality of cells such as 10 extending in a side-by-side row along the length of strip 8 crosswise thereof and each having a depth greater than the length of each of said terminal leads. Each said cell has transverse dimensions intermediate the transverse dimensions of the leads and bodies of said electric components.

Figure 3:
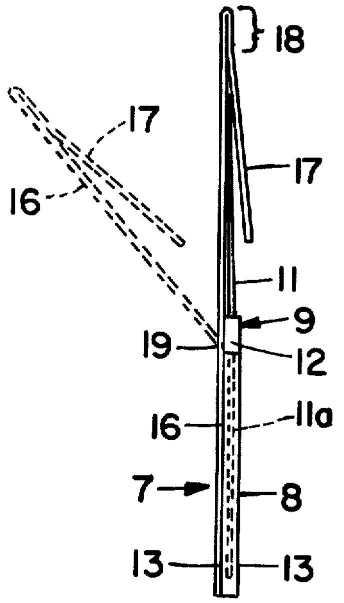
FIG. 3 is an end view of the package of FIG. 1, such view being taken along line 3—3 of FIG. 1 and including in broken line form a position of a cover flap of the package when it is manually manipulated to remove therefrom one or more of the electric components contained therein.
Figure 2:
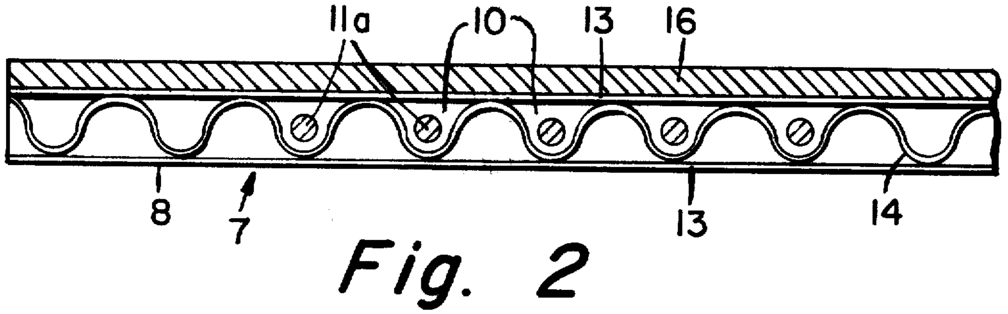
FIG. 2 is an enlarged cross-sectional view of part of the package of FIG. 1, such view being taken generally along line 2—2 of FIG. 1.

One of the terminal leads, such as the lead 11*a* for example, of each said electric component such as 9 is inserted or disposed in one of the cells such as 10 embodied in strip 8 so that the corresponding end of the body of each of the respective electric components rests against the ends of the cells as illustrated in FIGS. 1 and 3 of the drawings. The electric components may be disposed in package 7 in groups as illustrated in FIGS. 1 and 2 or may be so disposed in package 7 in a continuous row if desired. It is oftentimes desirable to arrange the components in equal groups thereof so that they ca[illegible]ed by a brief glance at the package or so tha[illegible] more groups thereof may be separated from the remainder of the package by cutting therebetween as is readily apparent. Cellular strip 8 may, for example, be a strip of corrugated paper board comprising a strip of corrugated paper 14 (FIG. 2) with the aforesaid upper and lower facing sheets such as 13 glued, cemented or otherwise bonded to the crests of the corrugations of the corrugated paper 14 and such corrugations, together with the facing sheets, thus forming said cells. In this connection reference is again made to FIG. 2 of U.S. Pat. No. 2,214,230, and correspondence between the carrier 8 of said figure of said patent and the strip 8 of the present invention will be readily apparent.

Referring to FIGS. 2 and 3 of drawings of the present invention, a somewhat resilient first strip 16 of stiff paper board or paper, that is, a strip of a springy panel of relatively thin cardboard or paper such as kraft paper, is securely adhered to one of the sides of strip 8 either by being glued, cemented or otherwise bonded to the facing strip such as 13 on said one side of strip 8. Such strip or panel 16 is generally equal in length to strip 8 and is bonded to said one side thereof with corresponding ends of said strips in general alignment with each other. However, strip 16 is of a width such that a portion thereof extends substantially beyond the ends of the terminal leads such as 11 of the electric components such as 9 when each of the leads 11*a* of such components are fully disposed in one of the cells or corrugations such as 10 of strip 8 as illustrated in FIGS. 1 and 3 of the drawings.

A retaining cover flap 17 also comprising a somewhat resilient strip of stiff paper or paper board, or a springy panel of relatively thin cardboard or paper, such as kraft paper, overlaps the ends of leads 11 of the components such as 12 and a substantial part of the length of such leads when such flap is in its normal position shown in FIGS. 1 and 3. That is to say, cover flap 17, when in its normal position, extends over the ends of the leads such as 11 of the components such as 12 and for a distance above said leads towards but short of the bodies of the electric components such as 12 when the cover flap is in its normal or closed position.

Figure 4:
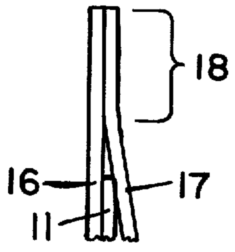
FIGS. 4 and 5 illustrate on an enlarged scale additional constructions for or forms of a part of a package embodying the invention.
Figure 5:
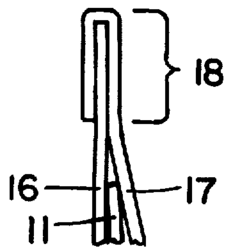

Cover flap 17 may initially be an integral extension of resilient strip or springy panel 16 as shown in FIG. 3 or, alternatively, may be a separate resilient strip or springy panel glued, cemented or otherwise bonded to strip or panel 16 as shown in FIGS. 4 and 5 so that the cover flap is integrally joined to or is joining with such strip or panel beyond the ends of the terminal leads such as 11. When the cover flap 17 is initially an integral extension of strip or panel 16, such panel is greater in width than otherwise and a part of such extension is folded and returned back upon and bonded to itself for a distance across a part of the width and along the entire length of such extension, to provide a stiffened region or junction, such distance being indicated in FIG. 3 by the reference character 18. It should be pointed out that the thickness of strip 16 and cover flap 17 as shown in FIG. 3 and the thickness of facing strips 13 as shown in FIG. 2 are somewhat exaggerated for purposes of clarity of the drawings.

As previously mentioned, the broken lines designated 16 and 17 in FIG. 3 illustrate a position of the cover flap 17 and the strip of panel 16 when the package is open, that is, when cover flap 17 is manually manipulated so as to remove from the package one or more of the electric components contained therein. To this end, a score line is preferably provided along the length of strip or panel 16 generally between the points designated 19 and 20 in FIGS. 1 and 3, that is, at or in the vicinity of the line of junction of panel or strip 16 with the cells or corrugations such as 10 of strip 8. Such score lines are, of course, well known in the art.

In opening a package such as 7 the cover flap 17 is lifted or raised and then moved to the left (viewing FIG. 3) with the under surface thereof being slid over or moved above the ends of the terminal leads such as 11 of components 12 and with cover flap or panel 16 also being moved to the left until the free end of cover flap 17 is clear of the ends such as 11 of the components 12. Cover flap 17 may then be released and, at such time, the stiffened region or junction of the cover flap 17 and strip or panel 16 provided by the bonded width of such parts and indicated by the reference character 18 causes cover flap 17 to return to its former position in relationship to strip 16 as illustrated by the broken lines in FIG. 3. The electric components can then be readily removed from or pulled out of the package. After the desired number of components is removed from the package 7, cover flap 17 is again lifted or raised to clear the ends of the terminal leads 11 and strip or panel 16 is returned to its initial position shown in FIG. 3. The cover flap 17 is then again released to permit it to move or substantially return to its covering and component retaining position under the resilient force of the previously mentioned stiffened region or junction 18. As will be readily apparent to those skilled in the art, the movements of cover flap 17 are the same whether such flap is initially an integral extension of strip 16 as shown in FIG. 3, or is a separate strip integrally joining with or bonded to such strip as shown in FIGS. 4 and 5, as previously mentioned.

Although there is herein shown and described only a few embodiments of the present invention, it will be understood that various changes and modifications may be made therein within the purview of the appended claims without departing from the spirit and scope thereof.

What is claimed is:

1. In a package for electric components each comprising a body of a selected planar configuration in a plane normal to the length of each respective component, and a terminal lead extending axially from each end thereof, such package including a strip of corrugated paper board having a corrugated paper sandwiched between upper and lower paper sheets with the crests of the corrugations adhered to the upper and lower paper sheets, said corrugated paper and paper sheets having a width greater than the length of each of said leads with the corrugations of the corrugated paper extending across said width and each corrugation having transverse dimensions intermediate the transverse dimensions of the bodies and leads of said components, the modification comprising;

I. a resilient first strip of stiff paper generally equal in length to said strip of corrugated paper board and having an upper surface adhered to the lower surface of said lower paper sheet with corresponding ends of said strips in general alignment, a portion of such resilient strip extending for a distance beyond the end of the exposed terminal lead of each electric component having its opposite terminal lead fully disposed in one of said corrugations; and II. a resilient second strip of stiff paper generally equal in length to said portion of said resilient first strip and integrally joining therewith along the upper surface thereof with corresponding ends of such resilient strips in general alignment, said resilient second strip extending a distance above the exposed terminal lead towards but short of the body of each said electric component having its opposite terminal lead fully disposed in one of said corrugations to provide a manually movable cover flap for normally restricting movement of each respective electrical component from said package.

2. A package in accordance with claim 1 and in which said resilient first strip of stiff paper has a score line extending the full length of such strip generally along the line of junction of the strip with said lower paper sheet.

3. A package in accordance with claim 2 and in which said resilient second strip of stiff paper is an extension of said resilient first strip folded and returned back and bonded to itself for a distance across part of the width and along the entire length of said portion of such resilient first strip which extends for a distance beyond the end of each said exposed terminal lead.

4. A package in accordance with claim 1 in which said resilient second strip of stiff paper is an extension of said resilient first strip folded and returned back upon and bonded to itself for a distance across part of the width of and along the entire length of said portion of such resilient first strip which extends for a distance beyond the end of each said exposed terminal lead.

* * * * *